May 26, 1931.  W. G. SMITH  1,807,447
GRAVEL SPREADER
Filed March 2, 1929   2 Sheets-Sheet 1

INVENTOR
William. G. Smith
Attorney

May 26, 1931. W. G. SMITH 1,807,447
GRAVEL SPREADER
Filed March 2, 1929 2 Sheets-Sheet 2
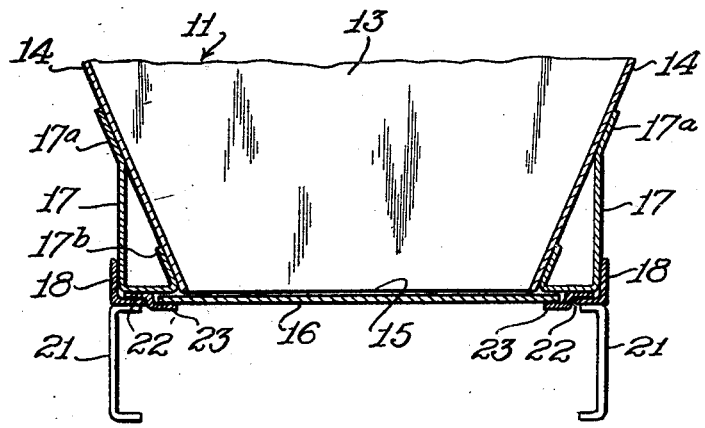
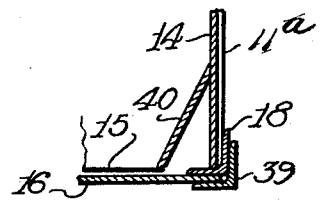
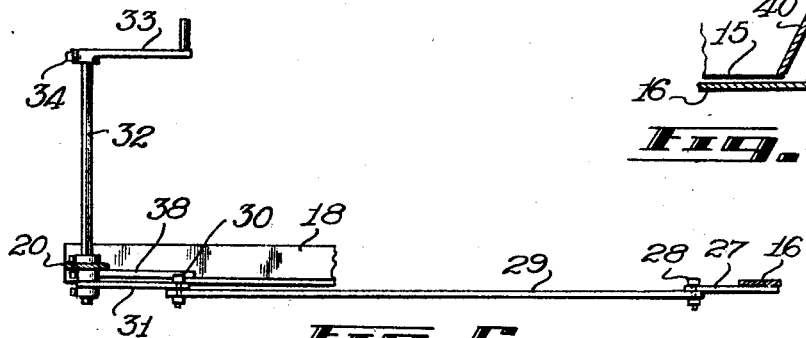
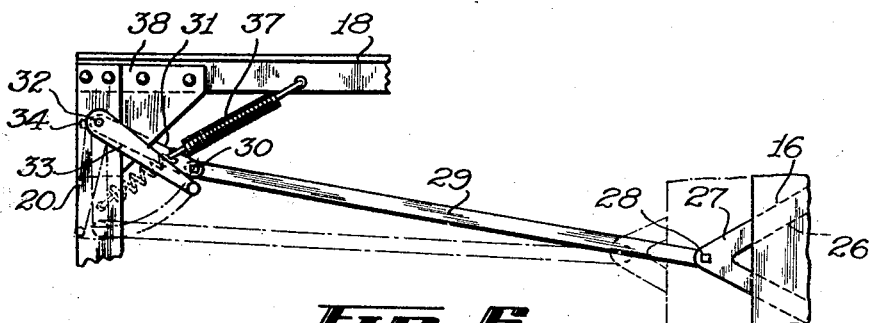
INVENTOR
William G. Smith Patented May 26, 1931

1,807,447

UNITED STATES PATENT OFFICE

WILLIAM GEORGE SMITH, OF ROSSBURN, MANITOBA, CANADA

GRAVEL SPREADER

Application filed March 2, 1929. Serial No. 343,955.

This present invention relates to certain new and useful improvements in a gravel spreader and has for its primary object the provision of a simple and efficient structure which may be readily operated in an efficient manner to regulate the quantity of gravel released and assure an even spreading of the gravel over the surface.

Another object of the invention resides in the provision of a gravel spreader of the character stated which is especially designed for use as a gravel spreader but may be employed for spreading sand, fertilizer or the like and which is constructed in such a manner that the regulating valve plates may be readily adjusted at any time by the operator, as desired.

The invention has for a further object the provision of a gravel spreader of the character stated including a tank or hopper carried on the frame of a truck and an extension thereof and firmly supported in position so that the valve plate slidable beneath the tank or hopper may be readily opened or closed by operating a controlling lever within ready reach of the truck operator.

The invention has for a still further object the provision of a gravel spreader of the character stated which is of extremely simple and inexpensive construction as well as substantial and highly efficient in operation and may be produced at small cost, thus making the proposition a very attractive commercial one.

The invention has for a still further object the provision of a spreader of the character stated in which the sliding valve plate is normally retained in closed position but may be opened as desired by the operator and adjusted to regulate the releasing of the material to be spread over the surface.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:—

Figure 3 is an enlarged vertical transverse section, taken substantially on the plane of line 3—3 of Figure 2, looking in the direction indicated by the arrows;

Figure 4 is a fragmentary detail section, showing a slightly modified form of the tank or hopper;

Figure 5 is a longitudinal vertical fragmentary section, showing the controlling and operating means for the sliding valve plate; and Figure 6 is a plan view of the structure shown in Figure 5.

Figure 1:
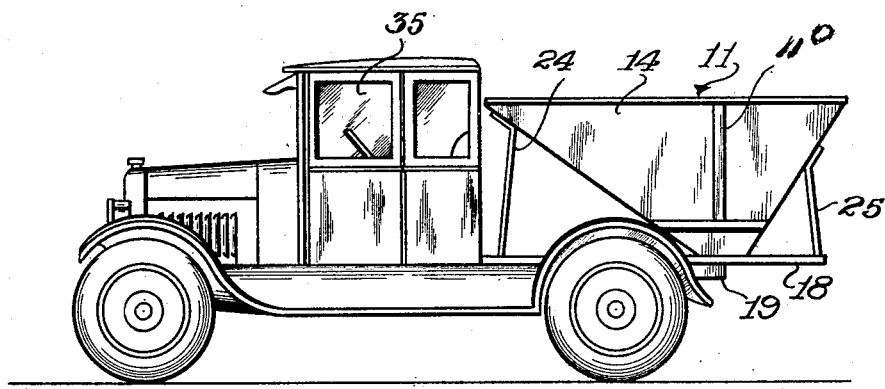
Figure 1 is a side elevation of the complete spreader.
Figure 2:
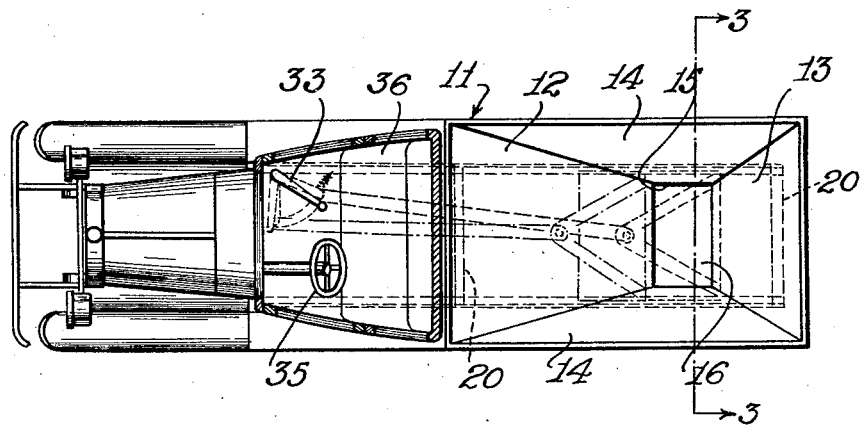
Figure 2 is a top plan view thereof.

Referring more in detail to the drawings, it is to be noted that the tank or hopper 11 has a comparatively long inclined front portion 12 and a comparatively short inclined rear portion 13 and the substantially triangular sides 14 are also inclined. The opposed edges of the front portion 12, the sides 14 and the rear portion 13 are securely united or formed together, thus providing a restricted rectangular open bottom 15 which is elongated transversely of the tank or hopper 11 and closed only by the sliding bottom valve plate 16 working beneath the tank or hopper 11. The tank or hopper 11 is mounted on triangular supports 17 provided at the lower portions of the tank or hopper sides 14 and have their lower outer corner portions resting in the longitudinal angle irons 18 supported on the rear portion of a truck body 19 and extending rearwardly therefrom. The lowermost portion of the tank or hopper 11 is located over the rear end of the truck body or chassis 19. The supporting longitudinal angle irons 18 are connected and braced by the spaced transverse frame members 20 and the angle irons 18 are appropriately secured on the longitudinal side channel members 21 of the truck frame or chassis 19. It is also to be noted that the upper edges 17a of the triangular supporting members 17 are turned outwardly and upwardly at an angle corresponding to the incline of the tank or hopper sides 14 and securely fastened to the outer face thereof by spot-welding or some other appropriate method. The inner lower edges 17b of the triangular supporting members 17 are also turned outwardly and upwardly on an incline corresponding to the upper edges 17a and firmly fastened to the outer face of the tank or hopper sides 14. Secured between the bottoms of the supporting members 17 and the longitudinal angle irons 18 are the guide plates 22 for the sliding bottom valve plate 16, and the guide plates 22 are provided with downwardly offset and inwardly directed opposed portions 23 on which the sliding bottom valve plate 16 operates beneath the open bottom 15 of the tank or hopper 11. The tank or hopper 11 is further supported and braced by upstanding braces 11a provided on the outer face of the tank or hopper sides 11 and by forward and rear upstanding supports 24 and 25 which are respectively located beneath the forward and rear ends of the tank or hopper 11 with their upper ends turned and secured on the under faces of the forward portion 12 and the rear portion 13 of said tank or hopper 11, while the lower ends of the supports 24 and 25 are mounted on selected transverse members 20 of the tank or hopper supporting frame.

Secured to the under face of the slide valve plate 16 are the diverging legs 26, of the substantially V-shaped member 27 to the bight portion of which is pivotally connected, by means of a fulcrum pin 28, the slide valve plate operating rod 29. The other end of the rod 29 is connected by a fulcrum pin 30 to the lateral arm 31 of the upstanding shaft 32 which is rotatably mounted in one of the transverse frame members 20 and carries the control lever 33 on its upper end, adjustably secured thereon by a set screw 34 or other appropriate means. The control lever 33 is located within ready reach of the operator of the truck, preferably near the truck steering wheel 35, so that the operator may at all times control the position of the slide valve plate 16 and thus regulate the spreading of the gravel or other contents of the tank or hopper 11, without leaving the operator's seat 36. It is also to be understood that the slide valve plate 16 is normally retained in closed position by a spring 37 having one end connected with the arm 31 while its other end is secured to one of the side angle irons 18. Corner brace plates 38 are employed at the connection of the ends of the transverse frame members 20 with the longitudinal angle irons 18, at the ends thereof, to firmly brace the corners of the frame structure.

In Figure 4 of the drawings, a slightly modified form of the invention is disclosed in which the narrow ends of the slide bottom valve plate 16 slide between the under face of the longitudinal angle irons 18 and the short angle irons 39 secured beneath the latter and in spaced relation thereto. In this form of the invention, the sides 14 of the tank or hopper 11 are extended straight down to the side angle irons 18, as well as the side braces 11a on the outer face of the tank or hopper. In this form, short inclined plates 40 are secured to the inner faces of the lower portions of the tank or hopper sides 14, to prevent the contents of the tank or hopper 11 from gathering at the lower edges of the sides 14 thereof instead of passing directly on to the slide bottom valve plate 16.

As the construction of the device has thus been described in detail, brief reference will now be had to its use and modus operandi: The tank or hopper 11 is firmly supported at the back of the truck frame or chassis 19 and the slide bottom valve plate 16 is normally in closed position beneath the open bottom 15 of the tank or hopper 11. When it is desired to permit escape of the contents of the tank or hopper 11, by discharging the contents and spreading the same over the surface on which the motor truck is operated, it is simply necessary to adjust the slide bottom valve plate 16 by operating the control lever 33, without interfering with the operation of the motor truck and without the necessity of leaving the operator's seat 36. When the control lever 33 is released, the spring 37 will immediately act to automatically return the control lever 33 to its initial position and thus, through the medium of the rod 29 and the arm 31 extending from the shaft 32 carrying the control lever 33, close the slide valve plate 16, which is at all times guided in a straight direction and prevented from turning to either side. Thus, efficient operation of the slide bottom valve plate 16 is assured and as it is held close against the bottom of the tank or hopper 11, danger of the contents of the tank or hopper 11 discharging when the slide bottom valve plate 16 is in closed position, is eliminated.

From the foregoing description taken in connection with the accompanying drawings, it will be manifest that a gravel spreader is provided that will fulfill all the necessary requirements of such a device, but as many changes could be made in the above description and many apparently widely different embodiments of my invention may be constructed within the scope of the appended claims without departing from the spirit or scope thereof, it is intended that all matters contained in the said accompanying specification and drawings shall be interpreted as illustrative and not in a limiting sense.

Having thus described my invention, what

I claim as new and desire to secure by Letters Patent is:—

1. A gravel spreader including a tank having a restricted open bottom; means for supporting the ends of the tank on a motor truck chassis; side plates for supporting the sides of the tank on the truck chassis; a slide bottom valve plate operating beneath said side plates and closing said bottom of the tank; means for cooperation with said side plates in supporting and guiding said slide bottom valve plate; an operating rod for said valve plate pivotally connected thereto; a rock shaft; a lateral arm extended from said rock shaft and pivoted to said operating rod to actuate the latter; means for operating said rock shaft; and means connected with said arm and the motor truck chassis to resiliently return the said arm, the rock shaft and the operating rod to normal position to close said valve plate.

2. A gravel spreader including a tank mounted on a motor truck chassis; supporting members for the ends of said tank; said tank having downwardly and inwardly sloping sides and ends with a restricted open bottom; angular supporting plates for the sides of said tank mounted on said truck chassis; co-operating angular members supported on said chassis below the said angular supporting plates; a slide bottom valve plate for closing the bottom of said tank; said valve plate having its longitudinal edges working between said angular supporting plates and the said co-operating angular members; an extension carried on the forward end of said slide bottom valve plate; a rod pivoted to said extension; an upstanding rock shaft; operating means for said upstanding rock shaft; an arm extended from said rock shaft and pivoted to said rod; and a spring connected with said arm and said chassis to resiliently retain said slide bottom valve plate in closed position beneath the said tank.

In testimony whereof I hereunto affix my signature.

WILLIAM GEORGE SMITH. [L. S.]